Dec. 6, 1955

B. B. FLOYD ET AL 2,725,819

POCKET RECORDING DEVICE

Filed Nov. 17, 1952

2 Sheets-Sheet 1

Baron B. Floyd
Earl W. Barry
INVENTORS

BY Clarence A. O'Brien
and Harvey B. Jacobson
Attorneys

POCKET RECORDING DEVICE

Filed Nov. 17, 1952 2 Sheets-Sheet 2

Baron B. Floyd
Earl W. Barry
INVENTORS
BY Clarence A. O'Brien
and Harvey B. Jacobson
Attorneys United States Patent Office 2,725,819

Patented Dec. 6, 1955

2,725,819

POCKET RECORDING DEVICE

Baron B. Floyd, Caracas, Venezuela, and Earle W. Barry, Madison, N. J.

Application November 17, 1952, Serial No. 320,864

2 Claims. (Cl. 101—107)

This invention relates to an item registering and recording device and it has for its principal object to provide a recording device adapted to produce a printed record containing a number of related items which is of very small size so that it may be carried in the pocket or pocketbook of the user and may be manipulated while held in one hand, the operation being simultaneously so simplified that it is essentially limited to the selection of the items to be recorded and in all other respects is practically restricted to one simple movement which automatically produces the printing and the advancing of the record sheets.

The main difficulty in connection with recorders of the above description consists in the reduction of the size of a recorder which is equipped with names for recording relatively complex and numerous related items. The relationship between items which are recorded is expressed by aligning the related items in one single line and therefore the device must also be equipped with means for line printing and for automatically advancing the recording sheet for the space of one line when the typing or printing of the line is carried out.

While many item registers or recorders are in existence they are usually only equipped for the registering or recording of a single item, for instance, of the time of an operation, or the delivery of a ticket or the like, and these devices which are sometimes portable are, nevertheless, of such shape and bulk that they can only be used by persons performing a certain specialized service who may carry openly the equipment necessary for such service. The purpose of the present invention, however, is to provide an item recorder adapted to be carried permanently by any person, because it may be expedient to use the recorder occasionally so that the possession or use of the recorder does not engage the attention of third persons, while on the other hand the record of any number of business or other transactions may be made immediately and therefore will afterwards be clearly registered on a record sheet.

According to the invention a small container which may be held in one hand and which is smaller than the palm of the hand is provided with a number of aligned tumbler disks carrying types with indicia, indicative of the transaction to be recorded which may be brought into a printing position. The printing positions for all the tumbler disks and the types thereon are aligned so that the indicia in one line are correlated, whereupon printing of the entire line may take place by applying a paper web and an inked ribbon against the types forming the line. This movement is the sole operational movement to be performed, apart from the selection of the correct item on the tumbler disks, and it is obtained by a closing movement of the hand holding the device which not only produces the printing of the line but also automatically advances the paper web, so as to bring a new line into printing position thus preparing the device for further recording. The same device also holds the paper on which the print is made in its operative position when the device is not in actual use.

The invention is illustrated in the accompanying drawings showing one embodiment thereof by way of example. It is however to be understood that this example does not provide a survey of the embodiments of the invention and has been mainly selected in order to explain the principle of the invention and the best mode of applying said principle.

Figure 1:
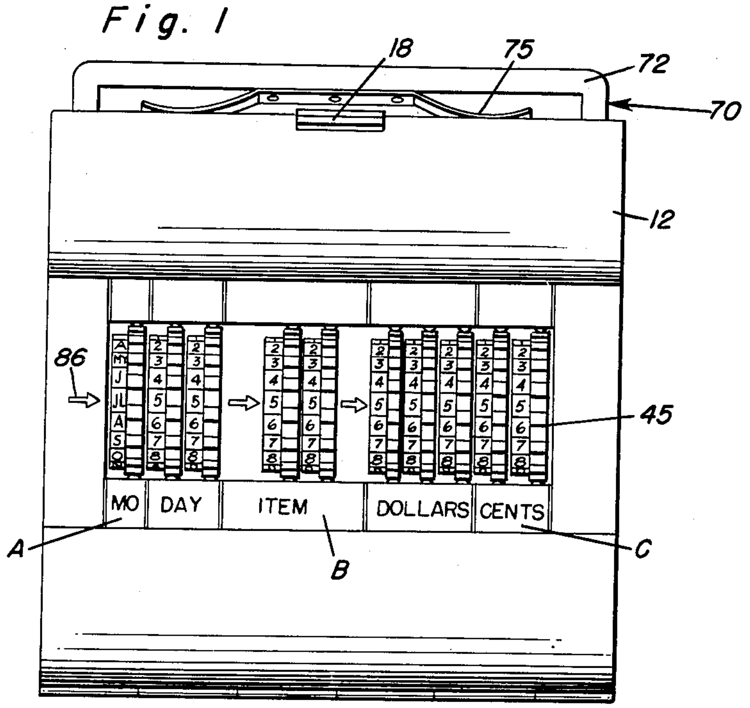
Figure 1 is an elevational front view of the device.

The general arrangement of the pocket recording device according to the invention is characterized by a container of a size which is smaller than the palm of the hand and which contains a number of aligned tumbler disks, each provided with a plurality of printing types adapted to print a figure, letter or word, or other indicia, one of which is brought into a printing position by rotating the disks by hand. All the printing positions are aligned along a single line which contains the types producing the printed record by means of an inked ribbon which is stretched along said line above the printing position. A sheet, tape or web of paper or of similar material is held above the printing position on spools and is movable transversely to the said printing line. When the operator moves a movable bar against said web, tape or sheet the latter is moved against the inked ribbon and against the types thus producing a record. This movement is usually produced by closing the hand in which the device is held and it simultaneously also acts on a ratchet device which, as soon as the printing has been completed, advances one of the spools and thereby advances the web, tape or sheet of paper for one line, thus making the device ready for a further imprinting.

Referring now to the accompanying drawings it will be seen that the recorder according to the invention comprises a housing 10 divided into two dish like halves one of which may be designated as a bottom portion 11 and the other as a top portion 12. The two halves are hinged on one side by means of hinges 14 and they may be fastened to each other at the other side by means of a latch 18 or any other closing device which may be readily opened by the operator or user.

The top portion 12 is essentially divided into three compartments 20, 22, 24, the two outer compartments 20, 24 being of partly cylindrical shape taking up the spools 25, 26 which are held in the bottom portion 11. The central compartment 22 is partly or fully open and houses the type carrying tumblers or tumbler disks 40 which are rotatably mounted on a spindle 16. The spindle 16 may be journaled in the side walls 42 of the top portion by means of ends 41 which fit into conical depressions 44 of the said side walls.

A portion 45 of the tumbler disks 40 projects through the open or partly open front portion of the top member 12 to the outside. The portion 45 of the tumbler disk is provided with notches 46. The position of the tumbler disks may be adjusted in the desired manner by moving the notched portion with the fingers. Preferably between the notches 46 flat portions 47 are provided carrying easily visible indicia which correspond to the types carried on the operative or printing half 48 of the tumbler disk and the moving of one of the indicia visible on these flat portions to a predetermined position indicates that the corresponding type on the other half 48 of the tumbler disk has been moved into the printing position.

A spring or springs 49*a* may be provided cooperating with the said notches 46 which holds the tumbler disks in their position and by engaging one of the notches excludes the moving of the tumbler disk into those positions in which the type on the operative half would not be exactly in a printing position.

The inner or printing portion 48 of the tumbler disks carries the types to be printed which preferably may have the shape and arrangement used, for instance, in connection with typewriters, stamps and the like and which may consist either of single figures or letters or of groups of figures or letters or in words or signs corresponding to the indicia to be registered.

A plurality of such indicia carrying types are arranged along the periphery of each tumbler disk half 48 and are brought alternatively into the printing position by rotating the disks, the printing position being the position directly facing the bottom portion 11.

The types which are in a printing position on the disks which are aligned along the spindle 16 form a line and along said line and above the printing position an inked ribbon 50 is fastened by means of prongs 49 which project from an inwardly projecting portion 51 of the top member 12. The prongs 49 hold the inked ribbon in a stretched position. By means of the ribbon the types leave a printed impression on the printing surface which is applied against it.

The printing surface is formed by a web or tape 30 of paper which is stretched between the two spools 25, 26 which are partly housed in the compartments 20, 24 of the top portion 12 but which are carried by the bottom portion 11. The paper web or tape may be of the type which is used for adding machine or for similar purposes and it is preferably coiled on one of the two spools from which it is unwound during operation and coiled on the other spool.

The bottom portion 11 carrying the spools may consist also of a dish like member with end portions which are partly cylindrical and which join the partly cylindrical portions of the compartments 20 and 24 of said top member 12. The side walls 57 of the bottom portion 11 have semi-circular ears 34 provided on their inside with conical journaling depressions 31, 32 respectively and in these depressions the conical ends 33, 35 of the spindles 36, 37 rest which support the front and rear spools 25, 26. The paper web or tape 30 is stretched between the spools and is unwound from one spool while wound up on the other.

Each spool has a cylindrical body provided with side flanges 64, 65 and also provided with a transverse slot 62, 63 which slot reaches essentially from one flange to the other. Through these slots the paper web is introduced and its end is held in the interior of the hollow body of the spool when the web is wound on the spool.

The flanges carry ratchet wheels 66, 67 on the outside by means of which the front spool may be advanced. Both spools may be alike and carry the ratchet wheels although only the ratchet wheels of the front spools are used during automatic operation.

The recorder is operated by means of an operating lever 70 carried by the bottom portion 11 the front side of which is provided with a push head 72 projecting beyond the bottom portion 11. A spring 75 is interposed between the inner side of the push head and the bottom portion 11 which spring must be depressed upon operation and which returns the operating lever to its position of rest. The body 76 of the operating lever extends backwardly into the interior of the bottom portion and its end is wedged shaped, as seen at 77, which wedge cooperates with a striker bar 80, also wedged shaped, and resting on the web of paper just above the printing position. When this bar therefore is moved toward the type line it will press the paper and the ribbon against the line of types and will thus make an impression of the line.

The bar is further provided with elastic pawls 85 which engage the ratchet wheels 66 and which advance the ratchet wheels through one tooth when the operating lever 70 is pressed back and engages the next tooth of the ratchet wheel and returns. The movement of the elastic pawls 85 advances the spool and the paper web 30 through the space between two lines.

The ratchet pawl when in its normal or forward position also acts as a locking pawl holding the ratchet wheel in its position and thereby locking the spool.

The nature of the indicia which are used is of course adapted to the special purpose of the recorder. Likewise the number of tumbler disks 40 or the number of characters or signs aligned in a line corresponds to this purpose. The tumbler disks may be arranged in groups as shown in Figure 1 where three groups A, B, C are illustrated. These groups in the example selected relate to the itemized recording of the expenses of an employee or salesman and they contain the dates at which the expense was made (group A) the nature of the item recorded, identified by means of a code character (group B) and the amount of the expense in currency (group C). A code sign table 82 may be fixed on the backside.

It will also be seen from Figure 1 that the visible indication of the tumbler disks 40 informing the operator what type or character is in the printing position always faces directly the operator and this indication may be specially distinguished from others by means of the marker 86 provided on the cover, if any, closing the open portion of the compartment 22 which is not occupied by the projecting tumbler disks.

The operation of the device starts with the loading which is performed by opening or unfastening the latch 18 by swinging apart the two main portions 11 and 12 for the purpose of inserting the paper web or tape. This paper web or tape, as already explained, may be identical with the paper web or tapes which are used in certain business machines. About ten feet of paper are usually used in a recording device of very small dimensions such as illustrated.

The ends of the paper tape or web are trimmed so that they are pointed and the pointed end is inserted into the slot 63 of the rear spool which is then turned forward using the flanges until the paper web or tape has been coiled on it. The remaining end of the paper tape is also trimmed and pointed and is inserted in slot 62 of the spool 25. Preferably the spool 25 is then turned a full turn to prevent slipping of the paper out of the slots.

Further a piece of typewriter ribbon is engaged in the prongs 49 and is pulled tight and also engaged on the prongs on the other side. The covers may then be closed and latched.

In order to make a record the pocket recorder is grasped in one hand with the front side up permitting the operator to set the date and the other items after he has consulted the code for setting the coded group of items. After the tumbler wheels have been set the operator merely makes a squeezing motion with his hand which holds the device and thereby drives the operating lever inwardly. This operating lever with its wedge shaped end 77 drives the striker bar against the paper web or tape and the latter against the ribbon which has been fixed above the types or characters and thereby the whole line is printed on the tape or web. When the operator again relaxes his hand the operating spring 75 returns the operating lever. It will have been noted that when the operating lever was pressed inwardly the pawls 85 were retracted and therefore came into engagement with a tooth of the ratchet wheel adjacent to the one which is engaged in its normal position. The forward movement of the operating lever therefore by moving the pawls forwardly also rotates the ratchet wheels 66 and thereby the spool 25 thus advancing the paper web or tape for the space of one line. It will also be noted that in its normal position the pawls 85 act as a locking pawl holding the ratchet wheel in its position. A locking mechanism, not shown, may be arranged in order to prevent movement of the ratchet wheels in the other direction.

Figures 2, 7:
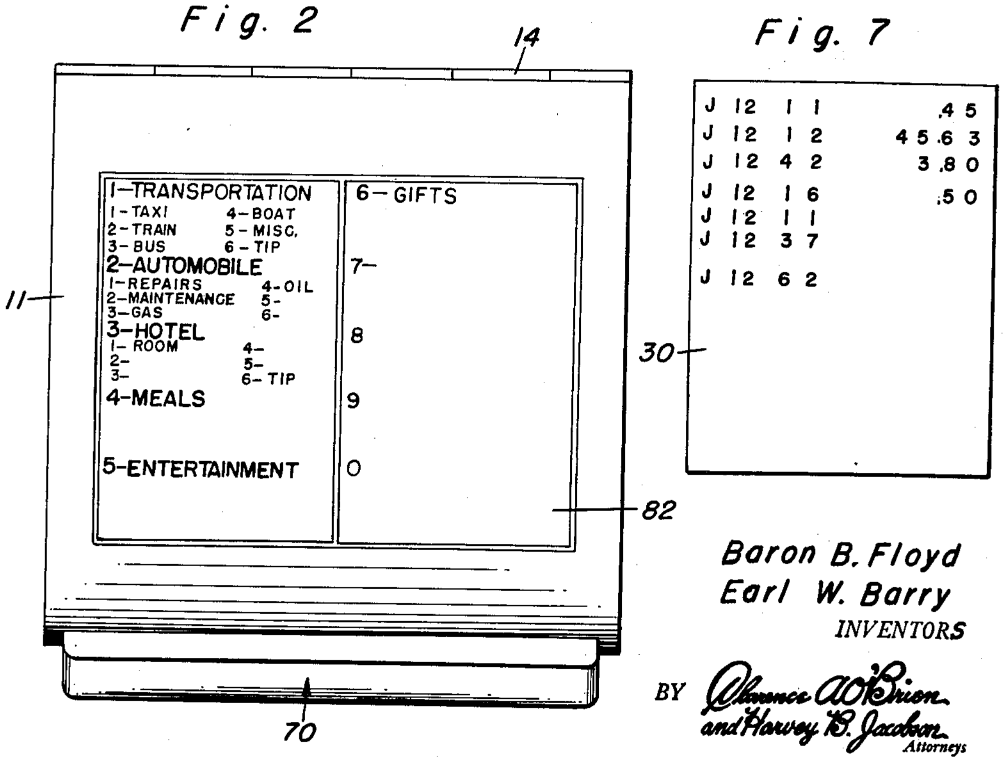
Figure 2 is an elevational back view of the device.
Figure 7 is a view of the paper web or tape when provided with the indicia corresponding to correlated items.
Figures 3, 4, 5, 6:
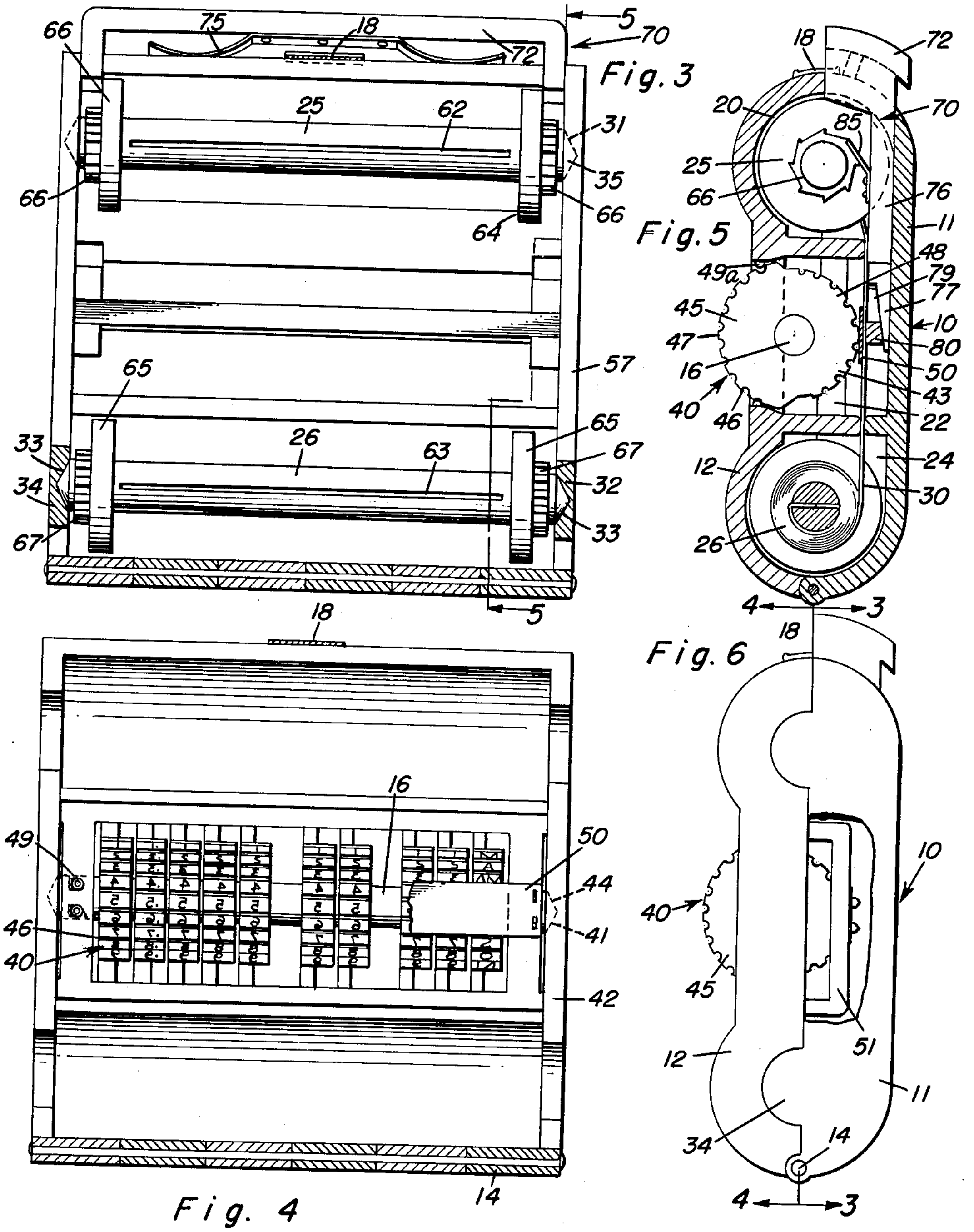
Figure 3 is an elevational view of the rear or bottom member, the direction of viewing being indicated by the arrows 3—3 in Figure 6.
Figure 4 is an elevational view of the top or front member the direction of viewing being indicated by the arrows 4—4 in Figure 6.
Figure 5 is an elevational sectional view, the section being taken along a plane indicated at 5—5 in Figure 3.
Figure 6 is an elevational side view of the device when assembled, part of the side wall being shown as broken away.

A recording sheet produced by the operation of the recording device is illustrated in Figure 7, each line of the recording sheet being printed simultaneously by the device.

From the above it will be seen that the construction according to the invention provides a very small and handy item recording device which may be carired in an inconspicuous way by the operator as it is smaller than the palm of the hand, said device nevertheless permitting a recording of correlated items with a precision and to an extent which was not obtainable with known recording devices. A special feature of the invention consists in the fact that the device is so arranged that an entire line with correlated items may be adjusted to contain said items and may be printed in a single operation, thus permitting simultaneously recording of a relatively large number of items at a time and so arranged that even rather complex transactions, such as stock exchange transactions, may be recorded using four or five figure codes instead of a two figure code as shown in the drawing. Further, the operation itself apart from the setting of the characters for the line, consists merely in the pressure exercised by the hand which holds the device and this operation can therefore not be accidentally omitted or incompletely performed thus making the record valueless. The operation itself is automatic as not only the printing of the entire line is produced by the operation of the operating lever but also the shifting of the record sheet, web or tape to the next line, thus readying said sheet, web or line for the next operation and excluding double printing on the same spot. The construction is thus suitable for use even for very inexperienced and mechanically unskilled persons while permitting a high degree of completeness of the record.

It will be clear that unessential changes may be made in the mechanism without in any way departing from the essence of the invention as defined in the annexed claims.

Having described the invention, what is claimed as new is:

1. A miniature recording device held in and operable by one hand, comprising a casing divided into two lockable halves one of said halves being provided with an essentially flat back portion adapted to be placed in the palm of one hand, the other half being divided into two closed end compartments and one open middle compartment, a transverse spindle supported by and held within the open compartment of the last named half of the casing, a plurality of tumbler disks, rotatably mounted on and aligned along said spindle, said tumbler disks being divided into groups, each group representing a separate recording item, each tumbler disk carrying a plurality of printing characters alternatively brought into a printing position, a plurality of indicia on each tumbler disk on that side of the tumbler disk which is turned toward an operator, said indicia indicating which character is in the printing position, all the characters on the aligned tumbler disks which are in printing position being aligned so as to form a single straight line, spools carrying a paper web and winding and unwinding the same, said web running longitudinally through the casing in parallelism and in close proximity to the flat back of one of said casing halves, said spools and tumbler disks being held in the casing with their axes in parallelism and in close proximity to each other, the tumbler disks being arranged between the spools, an inked ribbon fixed transversely in said casing between said paper web and said aligned tumbler disks facing the line of characters in printing position, an operating lever carried by the casing half which is provided with a flat back, an operating head on said lever, extending transversely in front of the last named casing half, said operating lever extending along the flat back and between the same and the paper web, said operating lever being operable by a closing movement of the hand holding the same, a movable striker bar extending transversely through the space between the paper web and the flat back of one casing half, provided with a wedge surface, a corresponding wedge surface on said operating lever, moving the striker bar against the paper web upon operation of the operating lever, a ratchet wheel on the paper web carrying roller, and a spring pawl on said operating lever for advancing the ratchet wheel upon longitudinal movement of the operating lever along the back of the casing half provided with the flat back.

2. A miniature recording device held in and operable by one hand, comprising a casing divided into lockable halves, one of said halves being provided with an essentially flat back portion adapted to be placed in the palm of one hand, the other half being divided into two closed end compartments and one open middle compartment, a transverse spindle supported by and held within the open compartment of the last named half of the casing, a plurality of tumbler disks, rotatably mounted on and aligned along said spindle, said tumbler disks being divided into groups, each group representing a separate recording item, each tumbler disk carrying a plurality of printing characters alternatively brought into a printing position, all the characters on the aligned tumbler disks which are in printing position being aligned so as to form a single straight line, spools carrying a paper web and winding and unwinding the same, said web running longitudinally through the casings in parallelism and in close proximity to the flat back of one of said casing halves, said spools and tumbler disks being held in the casing with their axes in parallelism and in close proximity to each other, with the tumbler disks being arranged between the spools, an inked ribbon fixed transversely in said casing between said paper web and said aligned tumbler disks facing the line of characters in printing position, ratchet wheels fixedly attached to said spools, an operating lever carried by the casing half provided with the flat back, said operating lever being applied against a spring holding it in its inoperative position, a transverse operating head on said operating lever arranged on the outside of the casing in a transverse direction, and moving the operating lever against the casing against spring tension when pressed, said operating lever being held in the space between the flat back of one of the casing halves and the paper web and being guided in its movement by said flat back and web, said operating lever being provided with a wedge shaped end, a transverse striker bar provided with an incline arranged in the space between the paper web and the flat back of the casing half guiding the operating lever, and being further arranged so as to face the printing line across the paper web, the inclined surface of the operating lever being applied against the incline of the striker bar, a spring pawl member fixed on each side of the operating lever, each pawl member cooperating with one of the ratchet wheels and locking the same in the position of rest, while advancing the same automatically upon return of the operating lever producing a printing of a line.

References Cited in the file of this patent

UNITED STATES PATENTS

| | | |
|---|---|---|
| 198,855 | Pole | Jan. 1, 1878 |
| 839,458 | Cummings | Dec. 25, 1906 |
| 1,556,782 | Glasgow | Oct. 13, 1925 |
| 1,737,878 | Gollnick | Dec. 3, 1929 |
| 1,994,431 | May | Mar. 12, 1935 |
| 2,117,451 | Robertson | May 17, 1938 |
| 2,460,659 | Schmidt | Feb. 1, 1949 |
| 2,534,364 | Moll | Dec. 19, 1950 |
| 2,547,472 | Jetter | Apr. 3, 1951 |